(12) United States Patent
Hasan

(10) Patent No.: US 10,460,464 B1
(45) Date of Patent: Oct. 29, 2019

(54) DEVICE, METHOD, AND MEDIUM FOR PACKING RECOMMENDATIONS BASED ON CONTAINER VOLUME AND CONTEXTUAL INFORMATION

(71) Applicant: Amazon Technologies, Inc., Reno, NV (US)

(72) Inventor: Shiblee Imtiaz Hasan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1059 days.

(21) Appl. No.: 14/577,327

(22) Filed: Dec. 19, 2014

(51) Int. Cl.
| | |
|---|---|
| G06Q 30/00 | (2012.01) |
| G06T 7/60 | (2017.01) |
| G06K 9/00 | (2006.01) |
| G06Q 30/06 | (2012.01) |
| G06F 16/951 | (2019.01) |
| G06F 16/583 | (2019.01) |

(52) U.S. Cl.
CPC .......... G06T 7/602 (2013.01); G06F 16/5838 (2019.01); G06F 16/951 (2019.01); G06K 9/00624 (2013.01); G06Q 30/0631 (2013.01); G06T 2207/10004 (2013.01)

(58) Field of Classification Search
CPC ..................... G06F 17/30256; G06T 7/602
USPC ...................................................... 705/26.7
See application file for complete search history.

(56) References Cited

U.S. PATENT DOCUMENTS

| | | |
|---|---|---|
| 3,849,967 A | 11/1974 | Angermeier et al. |
| 4,462,045 A | 7/1984 | Norris |
| 4,518,302 A | 5/1985 | Knapp |
| 5,619,587 A | 4/1997 | Willoughby, Jr. et al. |
| 5,737,491 A | 4/1998 | Allen et al. |
| 5,815,911 A | 10/1998 | Hase et al. |

(Continued)

FOREIGN PATENT DOCUMENTS

| | | |
|---|---|---|
| EP | 1160703 | 12/2001 |
| JP | 200424696 | 1/2004 |

OTHER PUBLICATIONS

Image Processing Based on Light Source Position (Year: 2014).*

(Continued)

*Primary Examiner* — Jeffrey A. Smith
*Assistant Examiner* — Lalith M Duraisamygurusamy
(74) *Attorney, Agent, or Firm* — Robert C. Kowert; Meyertons, Hood, Kivlin, Kowert & Goetzel, P.C.

(57) ABSTRACT

A packing service for packing objects into containers is disclosed. An image-capture device may capture an image of a container and the image may be used to determine the volume of the container. Contextual information associated with the container may be determined, such as objects already in the container, a destination for the container, or objects to be placed into the container, for example. The contextual information may be obtained from the image or from any of various services or systems. Items to be placed into the container are determined, based on the contextual information, for example. Recommendations to purchase items to pack into the container may be made. Recommendations of how to pack or arrange the items into the container may also be made. Additional images of the container may be captured and analyzed to determine whether the packing recommendations were followed or to determine additional recommendations.

25 Claims, 8 Drawing Sheets

(56) References Cited

U.S. PATENT DOCUMENTS

| | | | |
|---|---|---|---|
| 5,917,542 A | 6/1999 | Moghadam et al. | |
| 6,133,985 A | 10/2000 | Garfinkle et al. | |
| 6,260,495 B1 | 7/2001 | Stewart et al. | |
| 6,330,351 B1 | 12/2001 | Yasunaga | |
| 6,393,408 B1 | 5/2002 | Mosher | |
| 6,505,461 B1 | 1/2003 | Yasunaga | |
| 6,560,281 B1 | 5/2003 | Black et al. | |
| 6,583,813 B1 | 6/2003 | Enright et al. | |
| 6,622,127 B1 | 9/2003 | Klots et al. | |
| 6,907,711 B2 | 6/2005 | Ishii et al. | |
| 6,950,198 B1 | 9/2005 | Berarducci et al. | |
| 6,957,186 B1 | 10/2005 | Guheen et al. | |
| 7,028,723 B1 | 4/2006 | Alouani et al. | |
| 7,133,851 B1 | 11/2006 | Benson | |
| 7,142,707 B2 | 11/2006 | Abdollahi et al. | |
| 7,177,825 B1 | 2/2007 | Borders et al. | |
| 7,190,895 B1 | 3/2007 | Groves et al. | |
| 7,191,942 B2 | 3/2007 | Aptekar | |
| 7,266,522 B2 | 9/2007 | Dutta et al. | |
| 7,277,866 B1 | 10/2007 | Or-Bach et al. | |
| 7,346,564 B1 | 3/2008 | Kirklin et al. | |
| 7,416,119 B1 * | 8/2008 | Inderrieden | G01G 19/4144 235/378 |
| 7,542,926 B2 | 6/2009 | Arisman | |
| 7,596,260 B2 | 9/2009 | Tedesco et al. | |
| 7,686,171 B1 | 3/2010 | Shakes et al. | |
| 7,689,465 B1 | 3/2010 | Shakes et al. | |
| 7,769,221 B1 | 8/2010 | Shakes et al. | |
| 7,844,468 B2 | 11/2010 | Lahiri | |
| 8,032,249 B1 | 10/2011 | Shakes et al. | |
| 8,301,294 B1 | 10/2012 | Shakes et al. | |
| 8,433,437 B1 | 4/2013 | Shakes et al. | |
| 8,444,048 B1 | 5/2013 | Nidamarthi et al. | |
| 8,688,598 B1 | 4/2014 | Shakes et al. | |
| 8,706,860 B2 | 4/2014 | Trahan et al. | |
| 8,773,540 B2 | 7/2014 | Friend | |
| 8,806,517 B2 | 8/2014 | Petrovic et al. | |
| 2001/0016059 A1 | 8/2001 | Krahn et al. | |
| 2001/0043269 A1 | 11/2001 | Holloway | |
| 2002/0040333 A1 | 4/2002 | Fuwa | |
| 2002/0064314 A1 | 5/2002 | Comaniciu et al. | |
| 2002/0109863 A1 | 8/2002 | Monroe | |
| 2002/0184640 A1 | 12/2002 | Schnee et al. | |
| 2003/0042304 A1 | 3/2003 | Knowles et al. | |
| 2003/0107648 A1 | 6/2003 | Stewart et al. | |
| 2003/0120369 A1 | 6/2003 | Takaoka et al. | |
| 2003/0120545 A1 | 6/2003 | Grimsey | |
| 2003/0160097 A1 | 8/2003 | Steiner | |
| 2003/0195824 A1 | 10/2003 | Duffy et al. | |
| 2004/0041696 A1 | 3/2004 | Hull et al. | |
| 2004/0149823 A1 | 8/2004 | Aptekar | |
| 2004/0162634 A1 | 8/2004 | Rice et al. | |
| 2004/0220818 A1 | 11/2004 | Lahiri | |
| 2004/0263333 A1 | 12/2004 | Romeres | |
| 2005/0018058 A1 | 1/2005 | Aliaga et al. | |
| 2005/0049927 A1 | 3/2005 | Zelanis et al. | |
| 2005/0075989 A1 | 4/2005 | Biasi et al. | |
| 2005/0086257 A1 | 4/2005 | Wright | |
| 2005/0116033 A1 | 6/2005 | Moore | |
| 2005/0177441 A1 | 8/2005 | Bryant | |
| 2005/0216294 A1 | 9/2005 | Labow | |
| 2006/0086712 A1 | 4/2006 | Feldmeier | |
| 2006/0115165 A1 | 6/2006 | Chao et al. | |
| 2006/0136236 A1 | 6/2006 | Horton | |
| 2006/0165386 A1 | 7/2006 | Garoutte | |
| 2006/0170769 A1 | 8/2006 | Zhou | |
| 2007/0018992 A1 | 1/2007 | Wong | |
| 2007/0115361 A1 | 5/2007 | Bolas et al. | |
| 2007/0143837 A1 | 6/2007 | Azeez et al. | |
| 2007/0214065 A1 | 9/2007 | Kahlon et al. | |
| 2007/0291104 A1 | 12/2007 | Petersen et al. | |
| 2008/0052881 A1 | 3/2008 | Oertel | |
| 2008/0122951 A1 | 5/2008 | Yamamoto | |
| 2008/0130948 A1 | 6/2008 | Ozer | |
| 2008/0270612 A1 | 10/2008 | Malakapalli et al. | |
| 2008/0291202 A1 | 11/2008 | Minhas et al. | |
| 2009/0079830 A1 | 3/2009 | Ekpar | |
| 2009/0219387 A1 | 9/2009 | Marman et al. | |
| 2009/0235342 A1 | 9/2009 | Manion et al. | |
| 2010/0002071 A1 | 1/2010 | Ahiska | |
| 2010/0195825 A1 | 8/2010 | Cini | |
| 2010/0268659 A1 * | 10/2010 | Zimberoff | G06Q 10/08 705/336 |
| 2010/0274655 A1 | 10/2010 | Postrel | |
| 2011/0004680 A1 | 1/2011 | Ryman | |
| 2011/0145030 A1 * | 6/2011 | Allen | G06Q 10/06 705/7.12 |
| 2011/0153403 A1 | 6/2011 | Postrel | |
| 2011/0178889 A1 | 7/2011 | Abraham et al. | |
| 2011/0249121 A1 | 10/2011 | Taillade | |
| 2011/0283356 A1 | 11/2011 | Fly et al. | |
| 2012/0011025 A1 | 1/2012 | Hunt | |
| 2012/0038796 A1 | 2/2012 | Posa et al. | |
| 2012/0092494 A1 | 4/2012 | Garoutte et al. | |
| 2012/0096271 A1 | 4/2012 | Ramarathinam et al. | |
| 2012/0150611 A1 | 6/2012 | Isaacson et al. | |
| 2012/0200829 A1 | 8/2012 | Bronstein et al. | |
| 2012/0229679 A1 | 9/2012 | Georgiev et al. | |
| 2012/0242788 A1 | 9/2012 | Chuang et al. | |
| 2012/0242851 A1 | 9/2012 | Fintel et al. | |
| 2012/0243101 A1 | 9/2012 | Nagasaka et al. | |
| 2012/0281072 A1 | 11/2012 | Georgiev et al. | |
| 2013/0016181 A1 | 1/2013 | Penner | |
| 2013/0024584 A1 | 1/2013 | Marcus | |
| 2013/0151706 A1 | 6/2013 | Henriquez et al. | |
| 2013/0219468 A1 | 8/2013 | Bell | |
| 2013/0311990 A1 | 11/2013 | Tang et al. | |
| 2014/0152773 A1 | 6/2014 | Ohba et al. | |
| 2015/0170378 A1 * | 6/2015 | Moran | G06K 9/4064 348/135 |

OTHER PUBLICATIONS

U.S. Appl. No. 11/076,842, filed Mar. 10, 2005.
Mintcloud, B., "Money-Making Ideas for the Profit-Minded Supervisor," Supervision vol. 55, No. 10, pp. 22-23, Oct. 1994.
Dunn, K., "Tainted Gems Lose Sparkle as Prices Fall," Christian Science Monitor, World Section. p. 1, Oct. 27, 2000.
Anon, "Smith & Wesson Tactical Watch Line Now with Tritium: Safe New Technology Glows in the Dark for 25 Years," Business Wire, Dec. 8, 2004.
U.S. Appl. No. 14/229,575, filed Mar. 28, 2014, Jonathan J. Shakes.
U.S. Appl. No. 12/978,258, filed Dec. 23, 2012, Lakshmi S. Nidamarthi.
U.S. Appl. No. 12/978,263, filed Dec. 23, 2012, Lakshmi S. Nidamarthi.
U.S. Appl. No. 13/601,587, filed Aug. 31, 2012, Erik R. Parker.
U.S. Appl. No. 13/656,148, filed Oct. 19, 2012, Erik R. Parker.
U.S. Appl. No. 14/523,654, filed Oct. 24, 2014, Eugene Michael Farrell.
U.S. Appl. No. 14/161,428, filed Jan. 22, 2014, Deepak Suryanarayanan.
U.S. Appl. No. 13/928,283, filed Jun. 26, 2013, Deepak Suryanarayanan.
U.S. Appl. No. 14/283,179, filed May 20, 2014, Deepak Suryanarayanan.
Amazon CloudFront Developer Guide for API Version Nov. 11, 2013. Document updated Dec. 18, 2013, pp. 1-280.

* cited by examiner

DEVICE, METHOD, AND MEDIUM FOR PACKING RECOMMENDATIONS BASED ON CONTAINER VOLUME AND CONTEXTUAL INFORMATION

BACKGROUND

Accurately estimating how many heterogeneous objects a container can hold and determining an efficient manner in which to pack the objects into the container can be a challenge. A wide variety of situations call for such estimation, such as packing objects onto pallets, filling shelves with objects for storage or for sale, packing a shipping container with objects to be shipped, packing a grocery bag or packing a suitcase. For example, a traveler packing for an impending vacation may spend time packing and repacking, considering whether to pack this item or that item in an effort to pack a suitcase with as many objects as possible. Such a repetitive, trial and error-based process is inefficient and inaccurate, and can possibly leave available space unused. Furthermore, as the container is packed, the remaining available space in the container changes such that it is difficult for a person to determine what will fit in the remaining space.

Additionally, people are poor data collectors of information that may have an effect on what needs to be packed and how the objects are best packed. For example, a traveler may be unaware of the weather at the destination or changes in forecast at the destination and may pack objects that are inconsistent with the expected weather. In another example, a person may be unaware that certain items should be packed a certain way such as fragile items being packed with soft items or with additional packing material, or that the entire packed container may be subject to weight constraints, such as weight limits for airborne travel.

Also, it may be difficult to remember what has been packed such that changes to the objects being packed are tracked and accounted for. In general, people may be limited to remembering a relatively small number of objects. For example, a traveler may pack a suitcase over a number of days and forget whether this item or that item has been packed or not or what additional objects remain to be packed. In another example, if the traveler purchased an item for the trip, the traveler may be unsure whether the purchased item will fit with all the other objects in the suitcase or whether the purchased item will push the container over a weight limit. In another example, a traveler may have difficulty determine what size or weight item to purchase such that the item can be packed with other objects in the suitcase.

Figure 1:
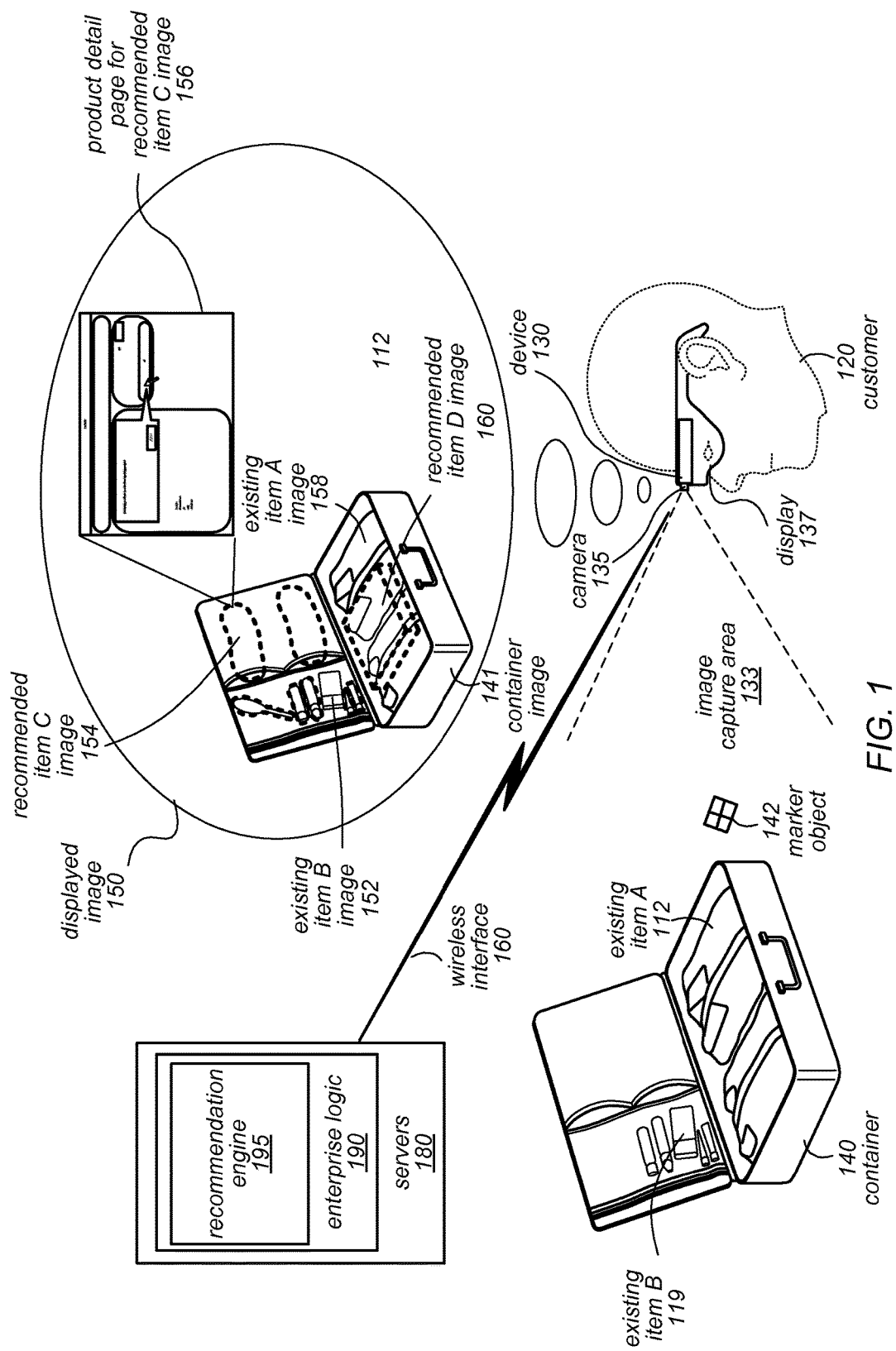
FIG. 1 illustrates a system and packing service for dynamic packing recommendations, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of devices, systems and methods for providing a packing service including a packing application and/or a recommendation engine, components or modules of which may be configured to obtain information about a container, determine context information for a packing operation associated with the container, determine packing recommendations based on the container and/or context information, and provide the packing recommendations are described.

The devices, systems and methods describe herein may be applicable to any number of different situations, such as, but not limited to, packing objects onto pallets, filling shelves with objects for storage or for sale, packing a shipping container with objects to be shipped, packing a grocery bag or packing a suitcase. For example, in some embodiments, a traveler may prepare for travel by opening a container (e.g., a suitcase) such that items needed during the planned travel can be placed or packed into the container. Image data of the container may be obtained with an image-capture device. For example, the traveler may use an image-enabled phone or may be wearing image-enabled glasses or may use some other image-enabled device such as a camera or heads-up display to obtain the image data. The image data may be used to determine the volume of the container that is available for holding packed items.

In embodiments, information about the context of the packing operation may be determined. The information may come from a number of different sources. For example, a packing recommendation service may determine from e-mail, a travel service, or some other information source that travel is planned and may prompt the traveler to provide an image of a suitcase such that features of a packing recommendations service can be provided. In another example, a packing recommendation service may review the traveler's purchase history and make suggestions about what items to pack based on the purchase history. The service may provide suggestions to purchase additional items, and may place orders on behalf of the customer based on context information. For example, the service may obtain travel information, destination information along with weather information for the destination and suggest purchase of clothing appropriate for the weather at the destination.

Spatial-based packing recommendations may be made based on the volume of the container and information about the context of the packing operation (e.g., via automated analysis), in embodiments. For example, the packing recommendation service may determine the volume of the suitcase from the image data and determine the size of the objects to be packed into the suitcase (e.g., from catalog information or from other image-based information) to build a computer model of how the suitcase should be packed with the objects. The recommendations or the computer model may be provided, for example, in a visual display illustrating the arrangement of the items or as audible instructions, for example.

In embodiments, additional image data may be obtained and used as feedback, to determine additional packing recommendations for example. For instance, an image capture device may continuously capture video as the customer prepares to pack the suitcase and as the packing process progresses. In some embodiments, the device may analyze the video to determine a stage in the process or to determine contextual information. For example, video may be analyzed (e.g., with machine vision techniques) to recognize that a suitcase is in the captured video and the application may prompt the customer whether the suitcase is to be packed. The video may be analyzed to determine changes in the scene, for example, whether objects have been moved into the suitcase or whether the customer appears to be in the process of packing the suitcase. In some embodiments, the application or device may analyze the video data to determine interesting scenes and send frames from the interesting scenes to a server for additional analysis. For example, the application may analyze the video data to determine scenes that include the suitcase and send frames of the suitcase to the server. Scenes that do not include the suitcase may be ignored, in embodiments. Other characteristics may be used to determine interesting scenes, such as scenes without panning, scenes where new objects have entered the scene, etc. In embodiments, the video analysis may attempt to recognize when a customer has responded to a recommendation (e.g., a recommendation to pack an item) and determine whether the recommendation has been followed, using the machine vision.

FIG. 1 illustrates a system and process for a packing service that provides dynamic packing recommendations, according to some embodiments. Various components (e.g., modules, components, services) of the system illustrated in FIG. 1 may perform various parts of the processes, illustrated in FIGS. 4-7. In embodiments, the devices and services illustrated in FIGS. 1-3 and 8 may perform all or some of the illustrated processes. The packing service may include a packing application and/or a recommendation engine (e.g., recommendation engine 195, in embodiments.

As illustrated, a customer 120 of the packing service may begin a process of packing a container 140 (e.g., a suit case). An image-capture device, such as a camera enabled glasses 130 may capture images of objects, such as the container 140, for example. In some embodiments, the device 130 may be camera-enabled glasses, as illustrated, a camera-enabled phone, or an image-capture device for example. The device may include any combination of portable or non-portable devices. For example, a camera-enabled laptop or a camera communicatively-coupled (e.g., via Wi-Fi or BLUETOOTH) to a mobile phone in combination. In the illustrated example, the device may capture images (e.g., continuously or intermittently) of the customer's surroundings that may include the container 140 and/or other objects in the viewable area surrounding the customer, for example, objects to be packed into the container. The images may be captured dynamically (e.g., as instructed by a packing service application or process, without customer input/direction) or manually (e.g., based on instruction from the customer). For example, an application (e.g., recommendation application 210, illustrated in FIG. 2 and described below) running on the device 130 may instruct the customer 120 to capture an image of the container 140 and the customer 120 may operate the camera-enabled device 130 to capture an image of the container 140.

In embodiments, a marker object 142 may be used or relied on as part of the image capture data. For example, an application running on device 130 may instruct the customer 120 to place an object of a known dimension within an image capture area 133 such that an image captured by device 130 includes both the marker object 142 and the container 140. In embodiments, the image capture area 133 may include objects in addition to or separate from the container. For example, additional objects in the image capture area 133 may be analyzed to determine contextual information (illustrated and described below, in FIG. 4). The marker object 142 may be used (e.g., by a recommendation application or a server-based recommendation engine (e.g., recommendation engine 195, illustrated in FIG. 3 and described below) to determine the dimensions and/or volume of the container 140, in embodiments. In embodiments, other recognized objects may be used in place of the marker object 142.

In embodiments, device 130 may communicate via one or more networks (e.g., wireless interface 160) with logic on one or more servers (e.g., enterprise logic 190 on servers 180). For example, part of the packing service may be implemented as part of enterprise logic 190 that runs on one or more servers 180. The packing service may be implemented as a service separate from enterprise logic 190 and/or controlled by an entity separate from the entity controlling the enterprise logic, in embodiments. The network (e.g., wireless interface 160) may include any combination of wired and/or wireless, public and/or private networks, in embodiments.

In embodiments, an application (e.g., recommendation application 120) running on device 130 may receive instructions from, or query recommendation engine 195 via the network. For example, recommendation engine 195 may learn from contextual information (e.g., from correspondence with a travel site the customer used) that customer 120 is expected to travel and may send instructions to the application on device 130 to request that the customer 120 capture an image of the container that the customer 120 is using for travel. In another example, the customer may initiate the packing process by interacting with the application on the device 130 to capture an image of the container 140 and request that the packing service 195 provide packing recommendations.

For example, device 130 may capture an image of the container 140 and marker 142 and send the captured image to recommendation engine 195 via wireless interface 160. The recommendation engine 195 may analyze the captured image to determine the volume of the container 140. The recommendation engine 195 may determine packing recommendations based on the volume of the container and contextual data or information (illustrated in FIGS. 4-7, described below). The packing recommendations may be sent from recommendation engine 195 to the device 130 via wireless interface 160 and an application on the device may instruct the packing recommendations to be displayed on the display of the device 130.

For example, displayed image 150 in FIG. 1 illustrates packing recommendations that may be displayed by the device 130 to customer 120. In the illustrated embodiment, the displayed image 150 is displayed on the display 137 of device 130, for example on the lens of the camera-enabled glasses. In other embodiments the displayed image may be displayed via heads-up display device, or otherwise. In some embodiments, the displayed image 150 may be displayed on the display of a phone or other device.

The displayed image 150 may include an image 141 of the container. The displayed image 150 may include images of items in the container. For example, existing item B image 152 and existing item A image 158 are illustrated as packed. In embodiments, the existing items may be recognized and accounted for in the volume calculations performed by the packing service, as described herein. The displayed image 150 of the container may include packing recommendations. For example, images of recommended items to be packed may be illustrated in an arrangement within the container, in embodiments. In the illustrated embodiment, an image 154 of recommended item C is indicated with a dashed outline of the item within a compartment of the container. In some embodiments, an image of a product detail page 156 or other interface element for the recommended item C may be displayed in the display image 150. In some embodiments, interface elements of the displayed image 150 may be user-selectable (e.g., via touch or verbal command) such that the customer 120 may interact with the packing recommendations (e.g., to indicate selection of the item for purchase or to move onto the next item). The container image 141 may be displayed together with an image of the product detail page 156 or separately from the image of the product detail page, in embodiments. In some embodiments, the image of the product detail page may appear upon selection of the one of the recommended items. For example, the display 137 may display the product detail page for a recommended item in response to the customer indicating interest in the recommended item.

In the illustrated embodiment, a number of packing recommendations have been made. For example, recommended item C has been recommended to be packed in the top flap of the container 140. The location-based recommendation is expressed as an image 154 of the item in a particular location of the container image 141. Another recommendation for the item C, a purchase-based recommendation is also illustrated in an image 156 of the product detail page for the item C. An estimated cost of the recommended items for purchase may be included in the item packing recommendation, in embodiments.

In embodiments, the customer 120 may interact via the user interface (e.g., a touch/visual or audible interface) of the device 130 to access features that are similar to the features provided on a product detail page of a network-based site, such as an e-commerce site. For example, such features as one-click ordering, obtaining additional information, selecting particular characteristics of the item (e.g., size/color), selecting a delivery address, etc. may be accessed via the user interface with the device 130. In embodiments, the packing recommendations and/or the customer's response to the recommendation may be made textually, or audibly or via gestures on the display.

Another packing recommendation is illustrated as recommended item D image 160. This location-based packing recommendation may be for an object or item that the customer already owns, but has not packed yet. In the illustrated embodiment, the image 160 illustrates (a) that the item D is suggested to be packed and (b) that a particular location of the item D is suggested as part of the packing process.

The customer 120 may respond to the packing recommendations by packing the items in the locations suggested and/or by packing the items in different locations. The packing service may provide feedback on the customer's response. For example, the camera-enabled device 130 may obtain additional image(s) of the container subsequent to displaying the recommendations, and the image(s) may be analyzed as described herein to determine whether the item has been packed in the recommended location. The system may dynamically (e.g., without customer input to the device) respond to the customer's response. For example, if the image analysis determines that item has been packed as recommend, another recommendation may be made without input from the customer 120. In another example, if it is determined that the item has not been packed or that the item was placed in a different location, or if another item was packed, for example, the packing service may respond in any number of various ways. For example, the packing service may respond by repeating the recommendation, re-analyzing the container and the items within the container to determine a new available volume and determine a new recommendation based on the new available volume, or prompting the customer for a next step to perform, such as purchasing an item, rearranging the items in the container or waiting to finish packing until an ordered item as arrived, etc.

Figure 2:
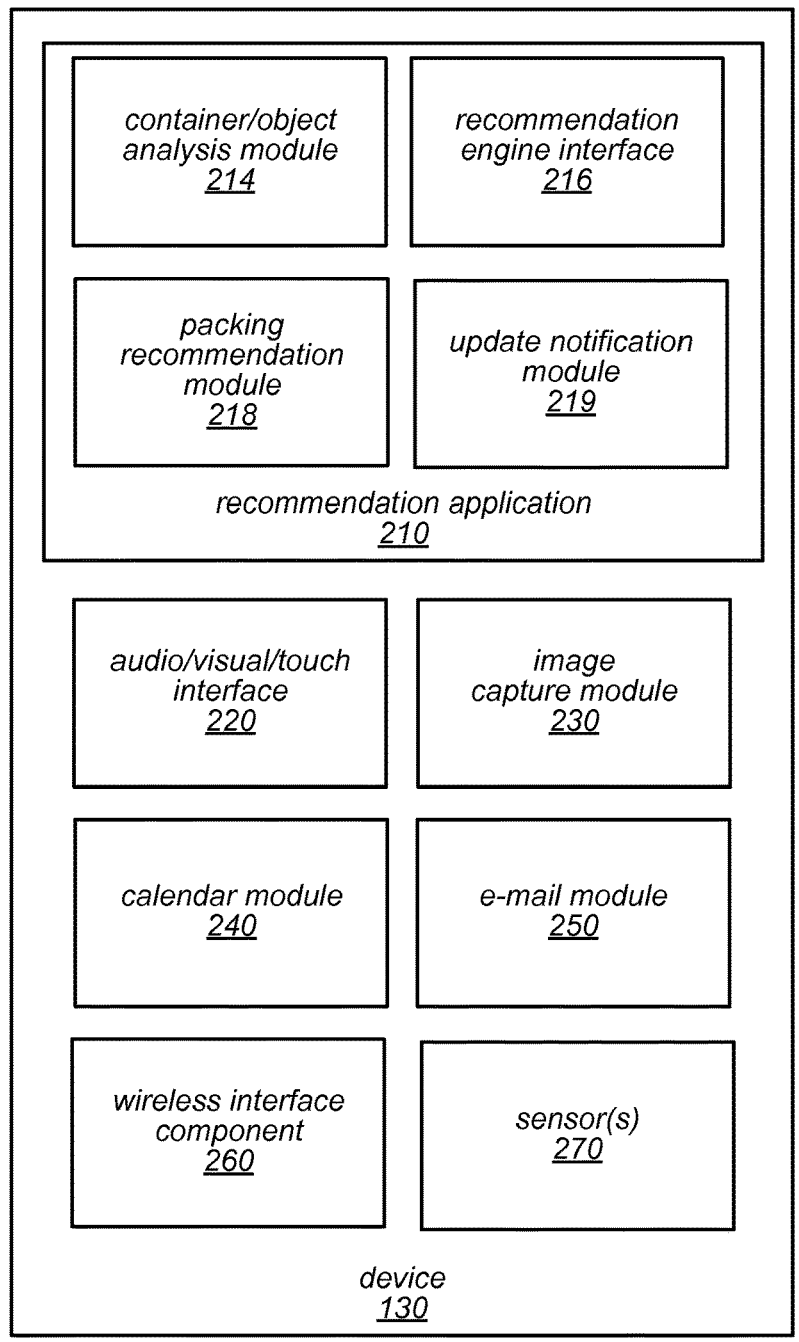
FIG. 2 is a block diagram of a device that includes a recommendation application for making dynamic packing recommendations, according to some embodiments.

FIG. 2 is a block diagram of a device that includes a recommendation application 210 for making dynamic packing recommendations, according to some embodiments. FIG. 2 illustrates a device (e.g., device 130) that may dynamically provide image-based container and object information and receive and/or display packing recommendations as illustrated in FIG. 1. The device 130 illustrated in FIG. 2 may perform some or all of the process illustrated in FIGS. 4-7, in embodiments.

FIG. 2 illustrates device 130 that includes a number of components such as, but not limited to a recommendation application 210, audio/visual/touch interface 220, image capture module 230, calendar module 240, e-mail module 250, wireless interface component 260 and sensor(s) 270. Device 130 may include more or fewer components than the illustrated components, in embodiments, and the components may be arranged in a different manner (e.g., components may be separated or organized in a different manner. The illustrated components may be communicatively coupled with one another and the device may be communicatively coupled with other system (e.g., via wireless interface component 260), in embodiments.

The recommendation application 210 is illustrated to include container/object analysis module 214, recommendation engine interface 216 and packing recommendation module 218. The recommendation application 210 may obtain image information and/or contextual information, in embodiments.

In the illustrated embodiment, device 130 is depicted with audio/visual/touch interface 220. Although other types of interfaces are contemplated as well, device 130 may be configured with a touch screen display, speaker and/or microphone, keyboard or the like that acts as an interface between the customer and the device 130. In some embodiments, contextual information may be entered into the device via the interface.

Contextual Information

Context information may include any of various types of information that may act as a basis for defining the context of the packing process, in embodiments. For example, travel information, destination information, user item packing preference information, available item information and calendar information are types of context information that may help to define the types of items to be packed. Other types of context information are contemplated as well. Context information may be suitable for the type of packing process.

For example, in an embodiment where the packing process is for packing a pallet, context information may include a maximum height the pallet can be packed to, such that the pallet can be placed into storage or onto transportation. In another example, in an embodiment where a grocery bag is being packed, item characteristics such as whether the item is fresh produce or uncooked chicken may be context information used to determine how to pack the grocery bag.

In a travel-based embodiment, travel information may include various types of travel-related information such as but not limited to forms of transportation, travel dates, number of people traveling, amount of luggage, etc. In embodiments, destination information may include various types of destination-related information such as but not limited to destination location, destination weather, destination customs, length of duration of stay at destination, etc. In embodiments, user item packing preference information may include various types of item packing preference information such as but not limited to preferred size of a suitcase, a preferred amount of time prior to the travel for completing packing of the suitcase, preferred items to pack, preferred arrangement of items to pack, quantity or characteristics of items to pack, or the like. In embodiments, available item information may include but is not limited to whether an item is in stock, whether the item can be delivered in time to be packed for the trip, whether the item will fit into the available volume of the suitcase, or other characteristics of the item such as size, color, shape, weight, etc.

In a travel-based embodiment, the travel destination and duration of the travel may be used to determine the types and amounts of clothes to be packed during the packing process, for example. In some embodiments, the volume of the container, such as the suitcase and the size/weight of the objects to be packed into the container may be part of the context information. Another example of context information may include the amount of time needed to ship a purchased item so that the item can be received and packed prior to the travel departure. Other context information may include other characteristics of the objects or container to be packed. For example, whether the container has compartments, what type of compartments, is the container hard or soft-sided, whether the container is carry-on luggage, whether any of the objects to be packed are required to be in checked luggage or are not allowed at all, whether an object is fragile, etc.

In embodiments, recommendation application 210 may communicate (e.g., via wireless interface component 260) with external systems and/or services such as those illustrated in FIG. 3 and described below, to obtain contextual information. Such contextual information may be obtained from a variety of sources, such as e-mail, calendar, travel services, customer profiles and/or preferences, and the like. In some embodiments, the contextual information may be obtained from the recommendation engine 195 (illustrated in FIG. 3) via the recommendation engine interface 216.

Contextual information may be obtained from the images captured by the device camera. In an example, the recommendation application may dynamically obtain an image via image capture module 230. For example, the image capture module 230 may be configured to instruct a sensor (e.g., an image sensor) to capture an image or video (as the customer opens the container, for example) without instruction from the customer. The recommendation application may instruct the image capture module 230 to capture an image or video and provide the image or video data may be provided to the recommendation application 210, without instruction from the customer, in embodiments.

In the illustrated embodiment, device 130 includes a recommendation application 210 that includes a container/object analysis module 214, a recommendation engine interface 216, and a packing recommendation module 218.

The container/object analysis module 214 of the recommendation application 210 may analyze the image data, or the recommendation engine interface 216 may send the image data to the recommendation engine 195 for analysis to determine contextual information based on the image. For example, in one embodiment, a customer may lay out all the objects to be packed and the container that the objects are to be packed into and direct the device (e.g., via audio/visual/touch interface 220) to capture image(s) of the objects and container. The image data may be analyzed (e.g., by container/object analysis module 214) to determine characteristics of the container and objects such as the number and size of the objects and the container are determined. The characteristics may be used (e.g., by packing recommendation module 218) to generate a computer model that arranges the objects within the container and an image of the model may be provided on the display of the device 130.

In some embodiments, updates to the contextual information may be received or obtained. The updates may be received subsequent to various milestones in the process, such as after determining the context data or after determining an item packing recommendation. For example, update notification module 291 may obtain or receive (e.g., receive via push technology, where the request for a given transaction is initiated by the publisher or central server) updated contextual information from any of various systems/services, such as the systems/services depicted in FIG. 3, described above. In a particular example, update notification module 219 may receive a push notification from the weather service 383, indicating a change in the weather and may pass the notification to recommendation sub-module 318 that may use the information from the push notification to update the item packing recommendation to recommend purchasing and/or packing a particular item. For instance, if the weather forecast for the destination has been updated from sunny to rainy, the item recommendation may be updated or an additional item recommendation may be generated recommending an umbrella. In some embodiments, the updated recommendation may be to swap out an object that has already been recommended.

Multiple different types of sensors 270 may be used to obtain contextual information, in embodiments. For example, the device may include a depth sensor that may be used to determine dimensional characteristics of the objects/container.

The recommendation application 210 may obtain the information and send the image information and/or the contextual information to a server to be analyzed, in embodiments. For example, the recommendation application 210 may send the information to recommendation engine 195 (illustrated in FIG. 3 and described below). In some embodiments, the analysis may be performed on the device 130.

Figure 3:
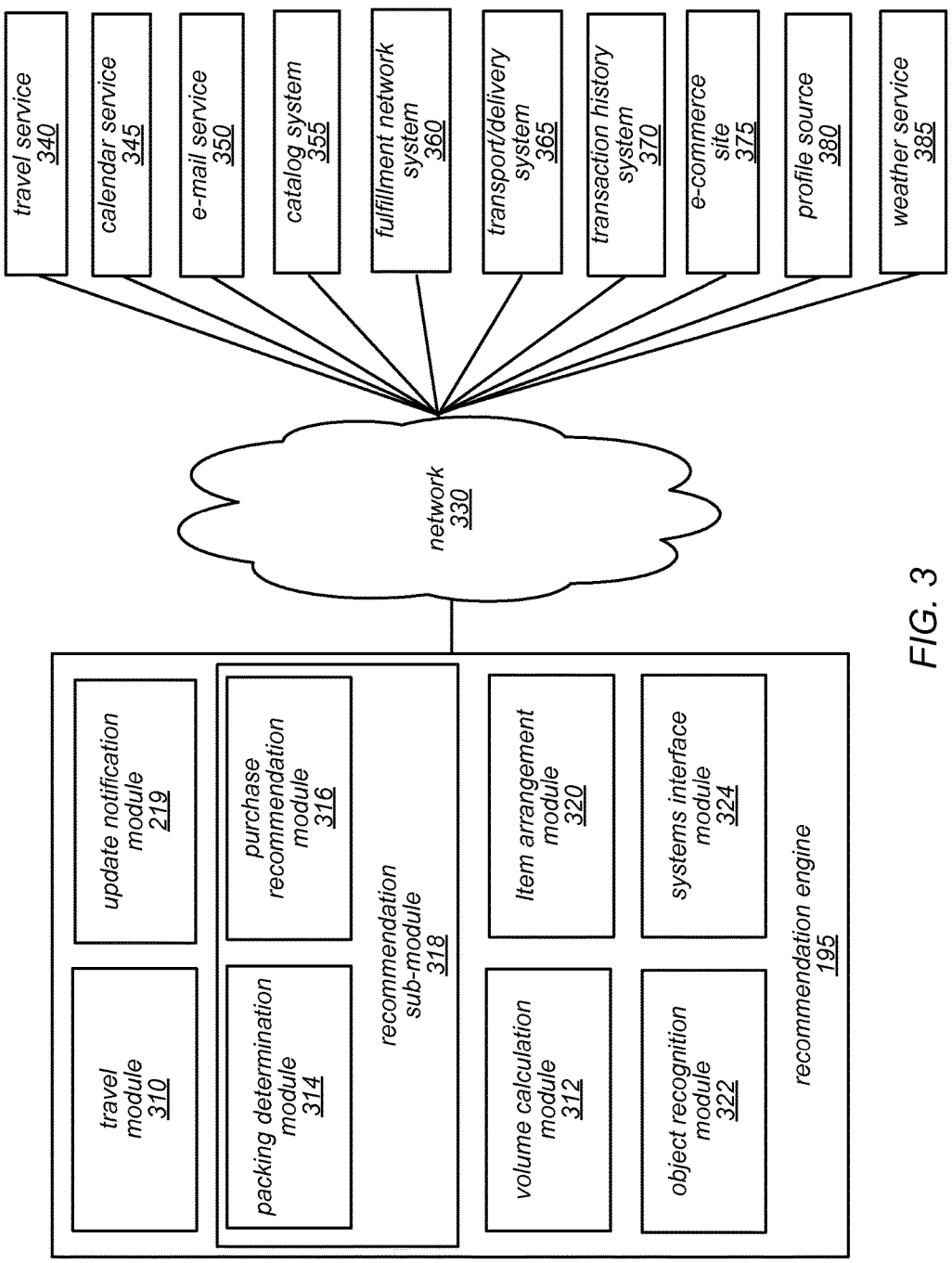
FIG. 3 is a block diagram of a recommendation engine and a number of systems with which the recommendation engine may communicate for making dynamic packing recommendations, according to some embodiments.

FIG. 3 is a block diagram of a recommendation engine and a number of systems/services the recommendation engine 195 may communicate with for providing a packing service that makes dynamic packing recommendations, according to some embodiments. In some embodiments, recommendation engine 195 may obtain container and contextual information and determine one or more packing recommendations. The recommendation engine 195 may perform some or all of the features illustrated in the processes depicted in FIGS. 4-7, described below.

Recommendation engine 195 may include more or fewer components than the illustrated components, in embodiments, and the components may be arranged in a different manner (e.g., components may be separated or organized in a different manner. The illustrated components may be communicatively coupled with one another and the recommendation engine 195 may interact with other system and services (e.g., via network 330), in embodiments. In the depicted embodiment, systems interface module 324 may act as an interface between recommendation engine 195 and the external systems and services 340-385.

The services and systems illustrated as external to the recommendation engine 195 in FIG. 3 may include more or fewer systems and services than depicted and the services and system may be organized in a different manner from that depicted. For example, the calendar and e-mail service are depicted as separate services in FIG. 3, but may be part of a suite of services provided by one enterprise, in embodiments. In another example, catalog system 355 and fulfillment network system 360 are depicted as separate systems in FIG. 3, but may be integrated into an end-to-end system that provides an e-commerce network site, catalog, and fulfillment network in an integrated system under the control of a single entity, in embodiments. In some embodiments, the recommendation engine may be operated as part of or separately from such an integrated system.

Any of the various illustrated services and systems may be integrated into a system (e.g., an enterprise system) or may be provided as separate systems that act as sources of various information. For example, travel service 340 may provide various travel-oriented information, such as a customer's travel plans including the number of travelers, destination, duration, modes of transportation, the amount of luggage being checked, and the like. Calendar service 345 may provide various schedule-oriented information, such as travel dates/destinations and/or how many folks are traveling. E-mail service 350 may provide numerous type of information, such as travel plans, purchase histories and the like.

Catalog system 355 may provide container and/or item information. Various forms of automated analysis may be performed. For example, the recommendation engine 195, or the recommendation application 210 may query the catalog system to obtain information about a container or objects. For example, character recognition may be used to analyze the captured image data and determine a brand name or model of a container. The brand name or model number may be used against entries in the catalog to identify the container. Similar analysis may be performed for other objects in the captured image. The catalog may be queried to provide container or object information such as the size/weight of objects/containers, for example.

Fulfillment network system 360 may be queried to provide fulfillment information. For example, various fulfillment networks may be queried to determine which fulfillment networks are able to provide the item/container. Items that cannot be fulfilled at all or in time for packing may not be recommended.

Transport/delivery system 365 may be queried and provide delivery estimates for various items. For example, purchase recommendation module 316 may query transport/delivery system 365 to determine if a purchased item can be delivered for packing in time, before travel begins, for example.

In some embodiments, recommendation engine 195 may receive a request from recommendation application 210 on device 130 to provide packing recommendations. In other embodiments, recommendation engine 195 may instruct recommendation application 210 to obtain container information and contextual information such that packing recommendations can be determined from the information.

Transaction history system 370 may provide transaction history for the customer/traveler. For example, recommendation sub-module 318 may query the transaction history system 370 to determine past purchases, such as a suitcase or items to be packed into the suitcase. In some embodiments, transaction history system 370 may be part of e-commerce site 375.

E-commerce site 375 may be a network-based site where e-commerce transactions are conducted. In some embodiments, the e-commerce site 375 may include other of the various services and systems depicted in FIG. 3. For example, e-commerce site may include catalog system 355, transaction history system 370 and profile source 380. In some embodiments, the recommendation sub-module may access the e-commerce site 375 to order items/containers. For example, the recommendation sub-module 318 may make a purchase-based recommendation to the customer via device 130 and receive back an indication to make the purchase. The recommendation sub-module 318 may place the order with the e-commerce site 375 on-behalf of the customer 120, in response to a one-click-based order input to the device 130 by the customer, for example.

Profile Information

Profile source 380 may include profile information from any of the services/systems 340-385 or may be a separate profile source, in embodiments. In another example, a social networking profile may act as a profile source. Generally, a profile source 380 may be any source that provides or acts as a source of customer profile information. The packing service may include or generate its own profile for customers, in embodiments. Profile information may be stored in the form of database entries and may include customer preferences and/or characteristics. For example, profile information may include clothing information such as size data, preferred colors, brand names, styles, etc. and/or preferred item information such as expensive or economy items and/or packing preferences like packing arrangement preferences or the number of items to pack, such as packing shoes separate from other items, or packing a pair of pants and a shirt for each travel day. Other preference data may include the customer's known container and items that the customer regularly packs, as a checklist, for example.

Generally, any of various events, considered in context, may cause a recommendation engine to dynamically determine that a container is likely to be packed with objects and trigger a packing recommendation service, as described herein. In some embodiments, the service may be dynamically initiated by the system, without instruction from a customer, for example. Various example contexts may include packing objects onto pallets, filling shelves with objects for storage or for sale, packing a shipping container with objects to be shipped, packing a grocery bag or packing a suitcase.

For example, in the context of traveling, in at least one embodiment, travel module 310 may dynamically obtain travel information. For example, travel module 310 may obtain travel information from a travel service 340, from analysis of e-mail content from an e-mail service 350, and/or from information from a calendar service 345. The travel module may determine, based on the obtained travel information, that a customer is about to travel to a destination, for a period of time. In some embodiments, such a dynamic determination may trigger a packing recommendation process, as described herein.

For example, based on the trigger, the recommendation engine 195 may instruction the recommendation application 210 to obtain an image of the container to be used during the trip. In embodiments, the recommendation application may dynamically obtain image data of the container as the customer observes the container, as illustrated in FIG. 1. In other embodiments, the recommendation application 210 may prompt the customer to provide an image of the container.

Container/Object Dimension Information

The image data may be provided to the recommendation engine 195 and analyzed by the volume calculation module to determine the volume or dimensions of the container. For example, the volume calculation module may rely on spatial modeling techniques that determine dimensions of the container from the image data. In another example, the volume calculation module 312 or the object recognition module 322 may use object recognition techniques to recognize the container (e.g., recognize a brand-name of a suitcase using machine-vision techniques) and query a catalog to determine the volume or dimensions of the container. In some embodiments, the customer may be prompted to enter the dimensions of the container via the user interface of the device or the dimensions may be estimated (e.g., small, medium, large, carry-on, etc.) by any of the disclosed or other techniques. The volume calculation module 312 may recognize (e.g., based on the image data or based on a description of the container from a catalog) that the container has various different compartments and include the compartments as available space for storage for consideration by the item arrangement module 320 and the packing determination module 314. In some embodiments, data from other types of sensors, such as a range finder or the like may be used to determine container or object dimension information. For example, machine vision techniques may be used to recognize dimensions of the container (or dimensions of other objects) and the volume of the container or object may be calculated from the dimensions. In embodiments, an available volume of the container may be determined by subtracting the volume of objects in the container from the volume of the container.

Object Recognition

Object recognition module 322 may be configured to recognize objects from the image data. For example, object recognition module 322 may analyze the obtained image data from the device 130 to determine objects that are already packed into the container 140 or to recognize objects that are to be packed into the container 140. Various object recognition techniques may be used. In some embodiments, the recommendation application 210 may prompt the customer to take an image/video of the object or to enter information about the object. The object recognition module 322 may interact with various e-commerce sites 355, catalog systems 375, profile sources 380, weather service 385, e-mail services or the like to determine objects. For example, the object recognition module 322 may match a list of items that are gathered from the image data to items that are referred to in e-mail for user profiles to recognize which objects have been purchased already. In some embodiments, the object recognition module may use machine vision techniques to recognize an object and obtain an item code for the object (e.g., a UPC or other code).

As described in the background section, people's perception of available volume or the volume of an object may not be accurate. Various computer-based analysis techniques (e.g., machine vision, 3D modeling) may be more accurate. Machine-vision may facilitate more accurate volume determinations and thus provide a more efficient and effective packing process due to the increased accuracy. Machine vision may include processes for acquiring, processing, analyzing, and understanding images (e.g., by electronically perceiving and understanding an image). Understanding an image may include understanding multi-dimensional data in order to produce numerical or symbolic information (e.g., in the form of decisions). Some of the processes may include using models constructed with the aid of geometry, physics, statistics, or learning theory. Image data can take many forms, such as video sequences, views from multiple cameras, or multi-dimensional data.

Machine vision and/or 3D computer modeling techniques (e.g., developing a mathematical representation of any three-dimensional surface of an object (either inanimate or living) via specialized software) may recognize concave areas or area in-between two items that remains available. Some example modeling processes include polygonal modeling, curve modeling and digital sculpting.

Such additional available volume may be used to determine additional items that can be recommended, in embodiments.

Recommendation engine 195 is illustrated with recommendation sub-module 318 that includes packing determination module 314 and purchase recommendation module 316. The packing determination module 314 and the purchase recommendation module 316 may perform some of the features illustrated in FIGS. 4-7 in an iterative, and/or back-and-forth manner. For example, packing determination module 314 may determine, based on contextual information, such as travel information and the customer's purchase/transaction history (e.g., from transaction history system 370 or e-commerce site 355) items to pack for the trip. For example, if the destination is a cold or rainy destination, packing determination module 314 may determine that a rain coat and sweater are appropriate items to pack. Packing determination module 314 may determine that an additional or larger container should be used/purchased, based on the weight or size of the objects to be packed into the container, for example. In some embodiments, the packing determination module 314 may rely upon default or known quantities or types of items, such as what an average person uses per travel day, for example, a pair of socks for every travel day or both business and casual clothes for each travel day of a business trip.

In some embodiments, the packing determination module 314 may rely upon packing recommendations in a packing recommendation database or logic such as a software-based rules engine to make such determinations. In some embodiments, the packing determination module may determine what to pack based on customer preferences from a profile source 380 or historical packing information from past packing processes, for example.

The purchase recommendation module 316 may obtain the determined items to pack from the packing determination module and determine which items the customer already has and which items should be purchased. For example, the purchase recommendation module 316 may consider the objects determined from the image data, customer profile sources 380, transaction history systems 370 and the like to determine what items the customer already has. For items that are determined to be packed, but are not already owned by the customer, the purchase recommendation module 316 may instruct display of a purchase-based packing recommendation via the device 130.

For example, the purchase recommendation module 316 may query the transaction history system 370 for the customer's past purchases and determine that the customer has not purchased a sweater that was determined for packing. The purchase recommendation module may query the customer's profile (e.g., from profile source 380) to obtain the customer's size and style preferences, match this data against available items from an e-commerce site 375 and generate a purchase-based packing recommendation to purchase the sweater from the e-commerce site 375.

In some embodiments, the purchase recommendation module 316 may pass characteristics (e.g., dimensions/weight) of the sweater to the packing determination module for determination of whether the sweater is appropriate for packing in the container. The packing determination module may confirm or deny recommendation of the selected sweater. In response, the purchase recommendation module may select another sweater, in some embodiments. In some embodiments, the purchase recommendation module 316 may obtain acceptable characteristics of the non-owned item (e.g., weight, size) from packing determination module 314 and use the characteristics as part of the query such that only items that fit the acceptable characteristics are returned from the e-commerce site 375.

In some embodiments, the purchase recommendation module 316 may pass characteristics of recommended items to item arrangement module 320, for example, to determine if characteristics of the item are appropriate (whether the sweater will fit into the container or make the container overweight) for packing. In other embodiments, the arrangement module 320 may communicate with the packing determination module 314 to determine how the determined items for packing should be arranged in the container 140. In some embodiments, the suggested arrangement of the items may be based on the type of item or characteristics of the item (e.g., fragile, heavy, etc.). In embodiments, the item arrangement module may consider and recommend different compartments of the container for packing certain items.

In some embodiments, the purchase recommendation module 316 may communicate with or query a transport/delivery system 365 to determine if the selected sweater can be delivered in time to be packed for the trip. For items that cannot be delivered in time, the purchase recommendation module 316 may query catalog system 355 for other sweater options, for example.

The purchase recommendation module 316 may dynamically (without customer interaction) continue this back and forth interaction with the various components and services and systems until a recommended item that meets the criteria determined by the context of the packing process is found. The item recommendation may be sent to device 130 and the device 130 may be instructed to display the item recommendation, as illustrated in FIG. 1, for example.

In some embodiments, characteristics of the item may be presented to the customer via the device user interface such that the customer may select characteristics of the item.

In embodiments, the recommendation sub-module 318 may direct the device to display a recommendation to become a member of a subscription-based shipping program such that purchased items are delivered to the customer on time, economically.

In embodiments, the recommendation sub-module may recommend that the customer purchase a container (e.g., a suitcase) along with the items to be packed into the container. In some embodiments, the container may be delivered to the customer with the purchased items already packed in the container. The container may be delivered to a destination that the customer is traveling to, in embodiments. In embodiments, a recommended item for purchase may be shipped directly to the destination to meet the traveler and the travel container. Selection of the item may be limited to items that fit in the remaining volume such that the item can return in the container at the end of the trip, in embodiments.

Figure 4:
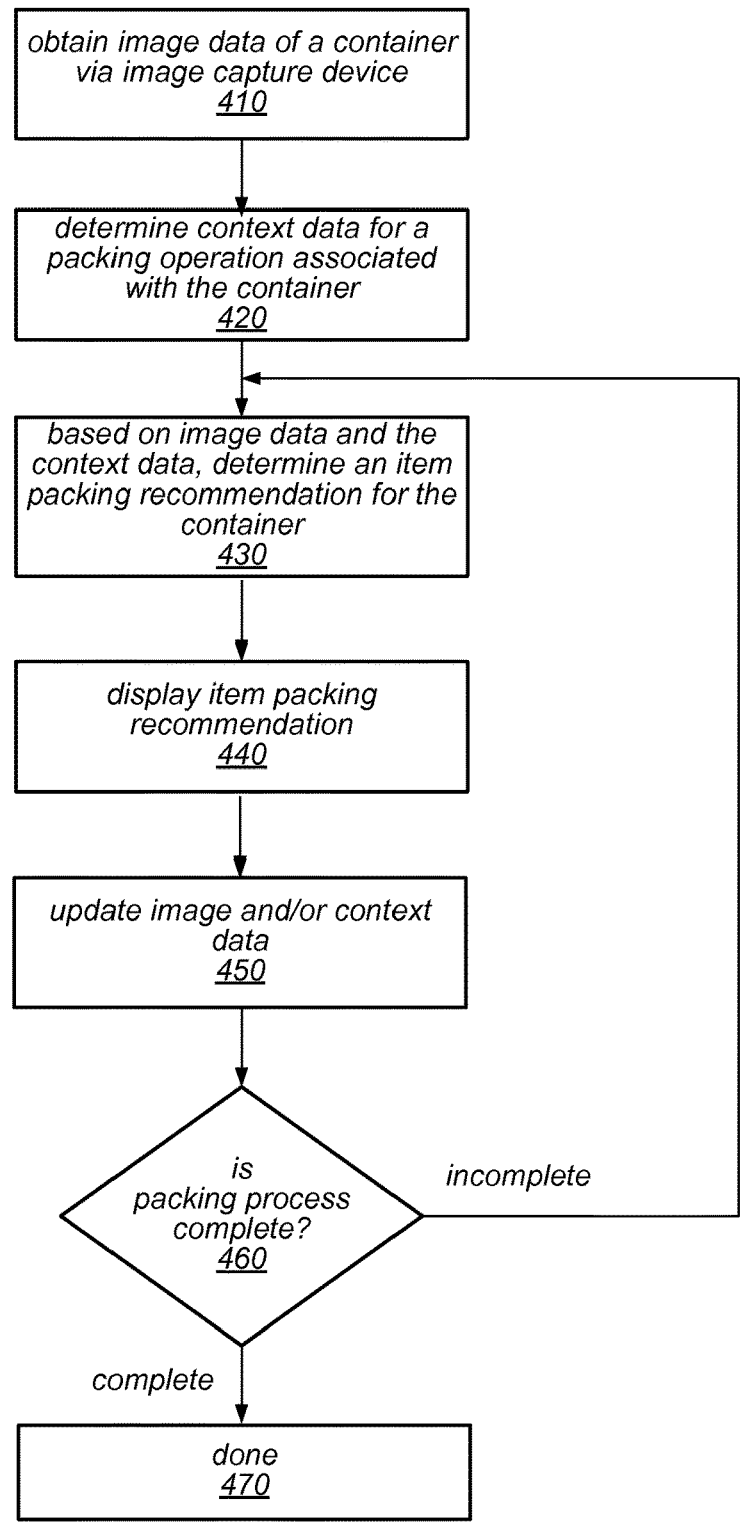
FIG. 4 is a flow diagram of a process for making packing recommendations, according to some embodiments.

In embodiments, the recommendation sub-module may determine that objects for more than one customer be packed into a single container FIG. 4 is a flow diagram of a process for making packing recommendations, according to some embodiments. At least portions of the illustrated process may be performed by recommendation application 210 or recommendation engine 195, in embodiments. Elements of the illustrated process may be performed in an order other than illustrated, in embodiments. In at least some embodiments, the illustrated process in FIG. 4 may expand upon the process illustrated in FIG. 1.

Image data of a container may be obtained via image capture device (block 410). For example, a camera 135 of a device may be instructed to capture an image. The image may include container 140 and various objects, such as existing items that are already packed into the container 130, a marker object 142 and/or items that have not been packed but are in the image capture area 133 of the camera field of view. Context data for a packing operation associated with the container may be determined (block 420). For example, the various objects, or the marker object may provide context. In another example, context information may be obtained from a packing service, from modules of the device, such as e-mail module 250 or calendar module 240 or from various systems or services, such as the systems/services illustrated in FIG. 3 (e.g., a travel service 340, transaction history system 370).

Packing Recommendations

An item packing recommendation may be determined, based on image data and the context data (block 430). As described herein, various types of packing recommendations may be made, purchase-based recommendations and spatial-based recommendations, for example. Spatial-based recommendations may be made in accordance with the processes illustrated in FIGS. 5 and 6, described below, in embodiments. Purchase-based recommendations may be made in accordance with the process illustrated in FIG. 7, described below, in embodiments. The packing recommendation may be determined by components of the recommendation sub-module, in embodiments. Other types of item packing recommendations are contemplated.

The item packing recommendation may be displayed (block 440). For example, device 130 may receive the recommendation from recommendation engine 195 or recommendation application 210 may determine the recommendation and the device 130 may be instructed to display the recommendation, as illustrated in FIG. 1, for example. In some embodiments, the recommendation may be provided via an audio-based interface of the device. The customer may be able to interact with the recommendation. For example, a customer may be able to select user-selectable interface elements of the recommendation, such as one-click purchase links and the like. In some embodiments, selection of a purchase link may direct the customer to an e-commerce site to purchase the item (e.g., the payment and delivery information may be entered or in a profile at the e-commerce site) or the selection of the purchase link may cause the application to place an order for the item on behalf of the customer using payment and/or delivery information from profile information or from information entered into the application by the customer, for example.

Image data and/or context data may be updated (block 450). For example, the packing service may dynamically (without customer input) instruct the device to obtain additional image data via sensors, such as an image-based sensor during the packing process. The image data may be dynamically analyzed, as described herein, to determine whether the items have been packed/arranged as recommended. In another embodiment, the user interface of the device 130 may be instructed by the packing service to ask the customer whether the customer would like to move onto the next packing recommendation.

Various determinations may be made based on the updated image and/or contextual data. For example, when a customer does not follow a spatial packing recommendation, the packing service may determine to reconfigure how items are packed in the computer model of the container and objects, such that the remaining recommendations are appropriate with the customer's chosen arrangement of the item. In another example, if a customer declines to purchase a recommended item, the packing service may determine whether the customer has chosen to forego the item (e.g., via prompts though the user interface), may offer a different item or may move onto the next recommendation.

In some embodiments, the updated image and/or context information may be used to determine whether the packing process is complete (block 460). If the packing process is incomplete (e.g., if additional items remain to be packed or if additional items remain to be purchased, for example), the process may return to determining another item packing recommendation based on the updated image data and context data (block 430). If the packing process is complete, the process may end (block 470, done). In some embodiments, reaching completion of the packing process for one container may trigger another packing process for another container or for another customer.

In some embodiments, the process illustrated in FIG. 4 may continuously or iteratively update. For example, contextual (e.g., weather) and/or image data (e.g., which items are in the container) may be updated and new determinations may be made based on the updated data.

Spatial-Based Packing Recommendations

Figure 5:
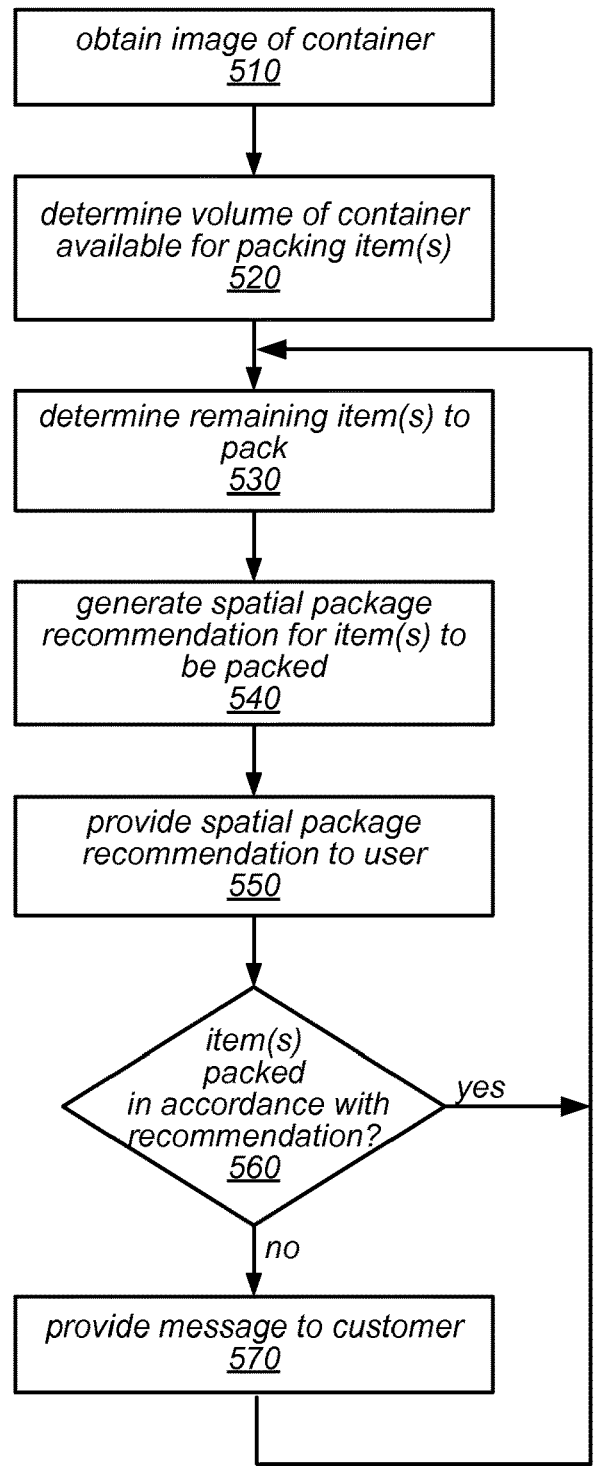
FIG. 5 is a flow diagram of a process for making spatial-based packing recommendations, according to some embodiments.

FIG. 5 is a flow diagram of a process for making spatial-based packing recommendations, according to some embodiments. Spatial-based packing recommendations may be determined based on the volume of the container being packed and the dimensions of the items being packed into the container, in embodiments. Other characteristics, such as weight or a fragile nature of an object may be considered, for example. Components/modules of the recommendation application 210 or the recommendation engine 195 may perform the analysis (e.g., via any combination of volume fitting algorithm and/or 3-D computer modeling of volume using data from image/depth sensors and computer imaging techniques, or the like) associated with spatial-based packing recommendations, in embodiments.

As illustrated in FIG. 5, an image of a container may be obtained (block 510). For example, various sensors, such as a camera and/or a depth sensor may capture data for a container. The container's available volume for packing item(s) may be determined (block 520). For example, the captured data may be used to calculate the container's available volume. In some embodiments, when the container already contains some objects, the overall volume of the container may be calculated and the volume of the items in the container may be subtracted from the overall container volume to determine the available remaining volume for packing.

Remaining item(s) to be packed are determined (block 530). For example, the recommendation application or the recommendation engine may determine the remaining items to be packed based on subtracting objects that have already been placed into the container (based on prior packing recommendations or based on image data about the current state of objects already in the container) from the total of items that will be held in the container.

A spatial package recommendation may be generated for item(s) to be packed (block 540). For example, item arrangement module 320 or container/object analysis module 214 may generate a computer model that arranges the remaining items in the remaining space of the container. Based on the computer model, the packing service may determine the next item to be packed and may generate a packing recommendation instructing the next item to be packed in accordance with the model, as illustrated in FIG. 1, for example.

A recommendation (e.g., a spatial-based packing recommendation) may be provided to the user (block 550). For example, the device 130 may be instructed to display an illustration of the computer-model, as illustrated in FIG. 1. The image/illustration may include a computer-generated model overlaid on an image of the container, in embodiments. The illustration (e.g., displayed image 139) may include indications of already-packed items (e.g., existing item B image 152) and indications of items to be packed in their recommended locations (e.g., recommended item B image 160). For example, the items to be packed may be indicated by a highlight characteristic or outlined in some manner that sets the items to be packed off from the items already packed. For example, the recommended item C image 154 and recommended item D image 160 are illustrated with dashed outlines that signify the items have not been packed yet and at the same time indicate an arrangement and/or position of the item to be packed.

A determination whether the item(s) are packed in accordance with the recommendation may be determined (block 560). For example, the camera-enabled device may capture images of the container subsequent to displaying the generated recommendation to the user. The captured images may be analyzed (e.g., using machine vision or the like) to determine if the item was packed in the recommended location of the container, or at all. If the item is determined to have been packed in accordance with the recommendation, the process may return to determine the remaining item(s) to pack (block 530) and so on. If the item is determined to not have been packed in accordance with the recommendation, a message may be provided to the customer (block 570). For example, the device may display a prompt to the customer noting the discrepancy and asking for instruction on what to do next. In some embodiments, the prompt may ask the customer to pack the item in accordance with the recommendation. In some embodiments, the prompt may ask the customer if the customer would like to arrange the items in the container in another manner consistent with the results of the machine vision analysis. In some embodiments, the prompt may ask the customer to move onto the next item. The process may continue on to determine remaining item(s) to pack (block 530), based on the customer's response to the prompt, in some embodiments, such as when the customer chooses to move on to the next item to be packed.

Figure 6:
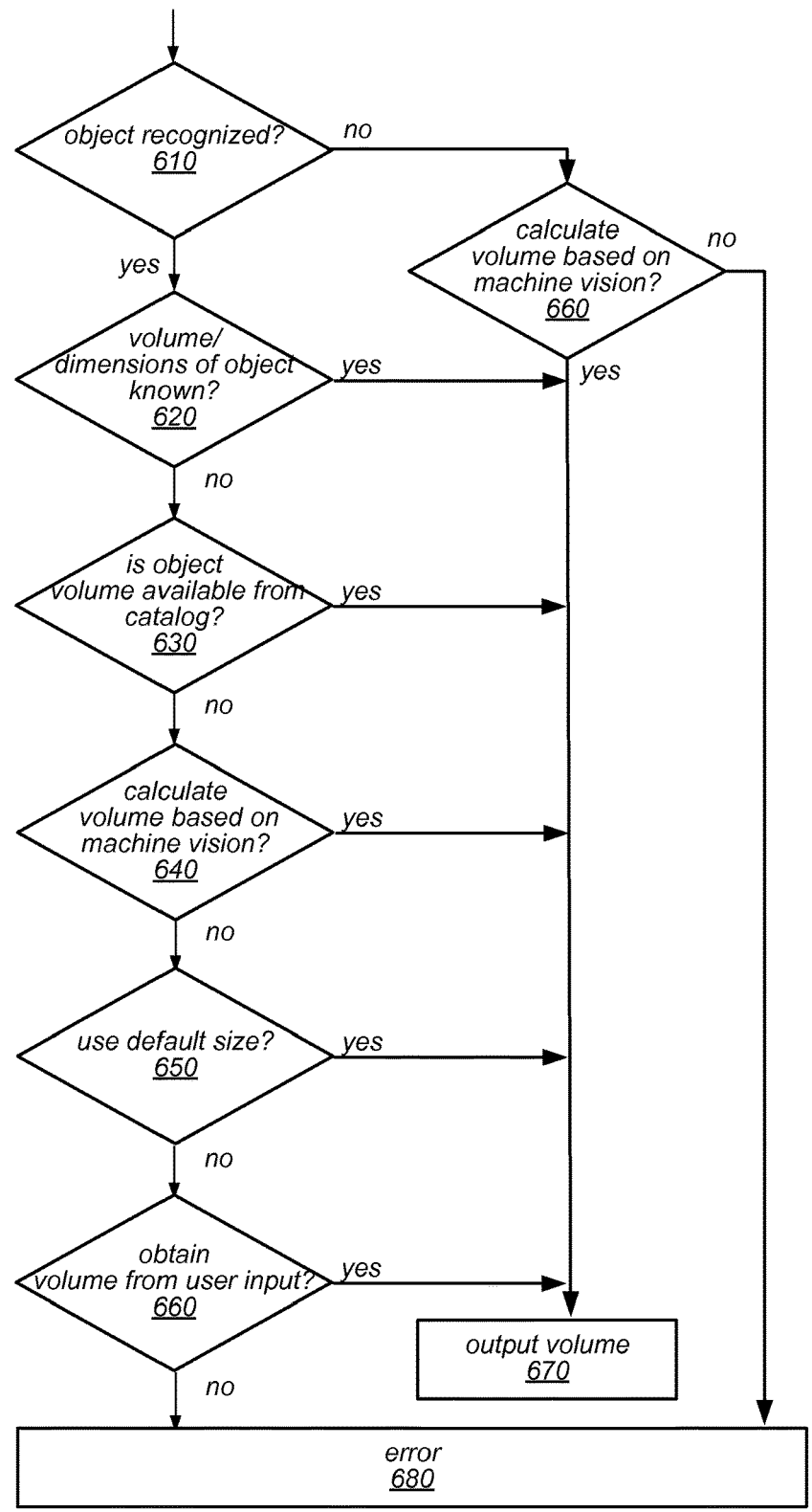
FIG. 6 is a flow diagram of a process for determining the volume of an object and/or container, according to embodiments.

FIG. 6 is a flow diagram of a process for determining the volume of an object and/or container, according to embodiments. The volume determination process may be used to determine the volume of a container to put objects into or the size of an object to be placed into a container, in embodiments. The volume determination process may be performed by the device (e.g., by the recommendation application 210) or by a server-based process (e.g., recommendation engine 195), in embodiments. The volume determination process may be performed at various times within the context of a packing process. For example, the volume determination process may be performed at the beginning of the packing process to determine the initial volume of the container. The volume determination process may be performed during the packing process, to determine changes to the available volume for packing, due to the addition of packed items to the container, for example. The volume determination process may be performed towards or at the end of the process to determine that the container is full, in some embodiments.

In embodiments, characteristics of an object may be received. For example, image-based data (e.g., a still image or a video image) may be received and the image data analyzed with any of various image-recognition techniques to determine objects in the image. In another embodiment, the customer may be prompted to enter information that provides characteristics of the object via the user interface of the device. A determination is made whether the object is recognized (block 610), by the object recognition module 316, for example. For example, various characteristics or features of the object, determined from the analysis of the image data may be compared to image information in a data store or entries in an item catalog. For objects that are not recognized, the system or device may calculate the volume of the object based on machine vision (block 660) and the volume output (block 670). If the machine vision volume calculation fails, an error may be generated (block 680). In some embodiments, the user interface may be instructed to display an error message or to instruct a new image be obtained or another item selected for volume determination.

For objects that are recognized, a determination may be made whether the volume/dimensions of the object are known (block 620). For example, the volume or size of some objects may be known from prior packing operations. For instance, if the customer/traveler is using the same suitcase that was used in the last trip, a record of the suitcase volume may be accessed. In another embodiment, the volume of a container or object may be obtained from a profile source 380.

If the volume/dimensions of the object are unknown, a determination of the object volume may be made from a catalog (block 630). For example, the object recognition module 322 may search a source of item information (e.g., a catalog system 355 or e-commerce site 375) to obtain data about the recognized object. For instance, the object recognition module 322 may use an item code, such as a UPC code or the like to query a catalog for information such as dimension, size, weight, etc. about the object. In embodiments, the source of the object information may provide the volume directly, or the volume may be calculated by the volume calculation module 312, from the dimensions for example. The object volume may be output (block 670).

If the object volume is not available from a catalog, the volume of the object may be calculated based on machine vision (block 640) and output (block 670). Otherwise, a default size may be used (block 650). In some embodiments, one or more default volumes may be assigned to an object, based on characteristics of the object, for example. For instance, the recommendation engine may include a data store including default volumes or sizes for various items with certain characteristics. A large sweater may be assigned one default volume value, while a small sweater might be assigned a smaller default value. In another example, a carry-on suitcase may be assigned a default or standard volume and a large checked bag may be assigned some larger default volume value. If no default size is available, the system may be configured to attempt to obtain the volume from user input. For example, instructions may direct the display to ask the customer to enter the volume as text or verbally. If the customer enters the volume, the volume may be output, as indicated at block 670.

If the volume cannot be obtained from the user, an error may be generated (680). In some embodiments, the user interface may be instructed to display an error message or to instruct a new image be obtained or another item selected for volume determination, for example.

Figure 7:
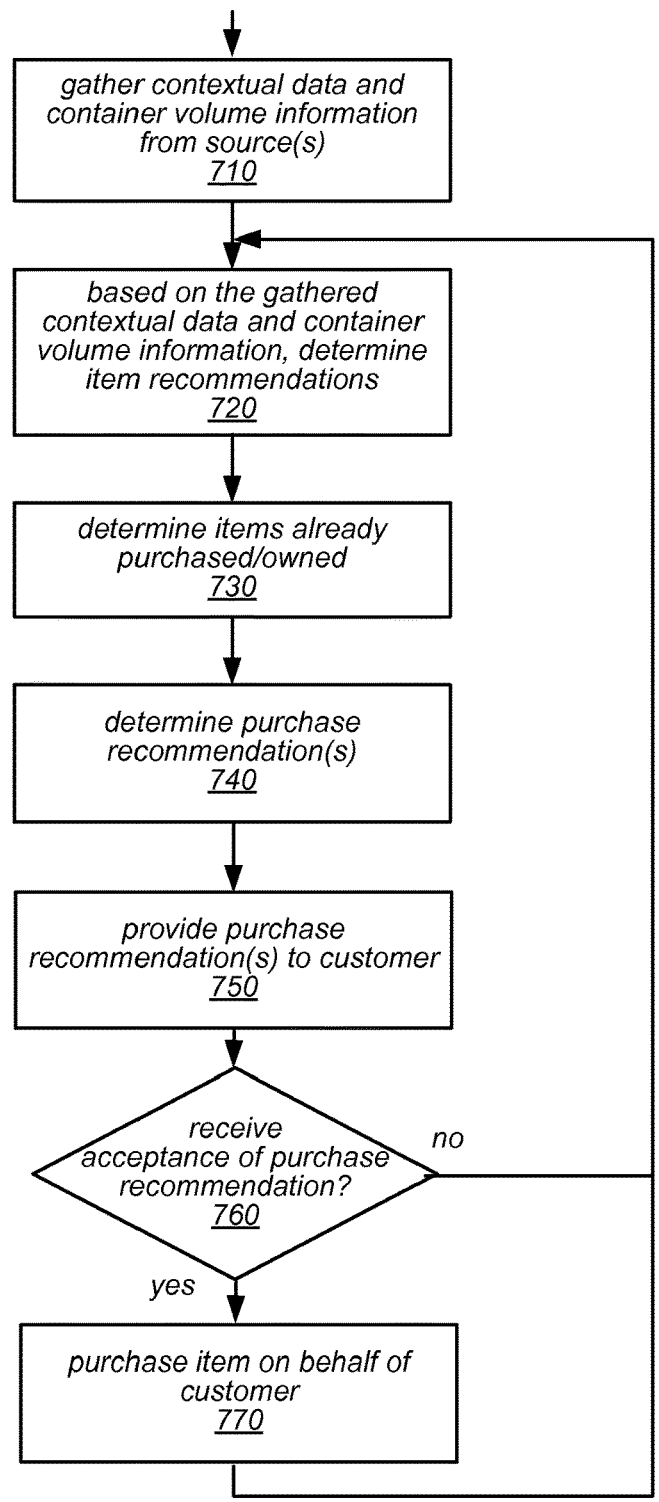
FIG. 7 is a flow diagram of a process for determining purchase-based packing recommendations, according to different embodiments.

FIG. 7 is a flow diagram of a process for determining purchase-based packing recommendations, according to various embodiments. The process may be performed to determine one or more purchases of items to be recommended to a customer using the packing service. The process may be performed by a recommendation application 210 or recommendation engine 195, in embodiments. Generally, the process may make purchase-based packing recommendations based on contextual data. For example, the packing service may determine that a customer does not own one or more recommended items for a trip and may display a recommendation to purchase the item to the customer via a device (e.g., device 130).

Contextual data and container volume information may be gathered from one or more sources (block 710). For example, recommendation engine 195 may gather container volume information (e.g., from image data from a camera-enable device or from profile information about the customer), travel data (e.g. destination, weather, duration) past purchase history (e.g., from transaction history system 370, or e-commerce site 375), profile information (e.g., from profile source 380), and/or fulfillment and delivery times for purchased items (e.g., from fulfillment network system 360, transport/delivery system 365).

Item recommendations may be determined, based on the gathered contextual data and container volume information (block 720). For example, packing determination module 314 may determine that a raincoat is suggested for a trip to Seattle. Items already purchased/owned may be determined (block 730). For example, purchase recommendation module 316 may determine that the customer does not have a raincoat, based on past purchase history, from a profile source or based on past packing process information. In some embodiments, the item recommendations may be limited based on the container volume information. For example, items that will not fit into the remaining volume of the container may not be selected for recommendation. In some embodiments, the purchase recommendation module 316 may restrict a query of an e-commerce catalog to only those items that will fit in the remaining volume (e.g., only thin sweaters or raincoats that have a compact characteristic).

A purchase recommendation may be determined (block 740). For example packing determination module may find an appropriate raincoat (e.g., based on a search on a network-based or e-commerce site) of the right size (based on size information from a profile source 380), determine that the coat can be purchased (e.g., from e-commerce site 375), fulfilled (e.g., by fulfillment network system 360) and delivered (e.g., by transport/delivery system 365) prior to the start of the travel time (determined from calendar service 345). The determined purchase recommendations may be provided to the customer (block 750). For example, a device may be instructed to (e.g., device 130) to display one or more purchase recommendations, as illustrated in FIG. 1.

An acceptance of the purchase recommendation may be received (block 760). For example, the device may receive input, via a user interface of the device 130. The input may indicate that the customer has accepted the purchase recommendation. If no acceptance is received, or if the offer is declined, the process may return to determining item recommendations based on the gathered contextual data (block 720) and so on. For recommendations that are accepted, the item may be purchased on behalf of the customer (block 770). For example, the purchase recommendation module may place the order with the e-commerce site and direct delivery of the item to the customer such that the item is received prior to the travel departure, or at the travel destination. In some instances, a missing item may be shipped to a destination other than the current location (or packing location) such as the travel destination. For example, time constraints (e.g., not enough time left to deliver the item prior to the start of travel) may be overcome by having a purchased item shipped to the destination (e.g., instead of to a customer's home). The system may (e.g., based upon context information) know that is was not possible to get the missing item packed into a suitcase before leaving. The system may make sure that sufficient room is left in the suitcase to bring the item that was delivered to the destination back in the suitcase. Once the order has been placed, the process may return to determining item recommendations based on the gathered contextual data (block 720) and so on.

In embodiments, features of the processes depicted in FIGS. 1 and 4-7 may be performed in parallel. In some embodiments, the features of one process may inform the features of other processes. For example, the spatial analysis in FIGS. 5 and 6 may inform the purchase-based process illustrated in FIG. 7, providing an amount of available space for a purchased item.

In some embodiments, features of one process may be performed in real-time or near real-time with other features of the same or other process. For example, in some embodiments, the device 130 may obtain or capture image/video data while the device 130 is displaying the display image 150 and/or while the customer is responding to the displayed image 150. For instance, the device may be configured to capture how the customer responds to the recommendation, capturing image/video data of the customer packing the recommended item or packing a different item or capturing image/video data of the item that was packed in response to the recommendation. The captured image/video data may be used to determine and display feedback, in some embodiments. In another example, another recommendation may be determined while the customer responds to the packing recommendation, based on updated image/video data or based on other updated contextual information.

Figure 8:
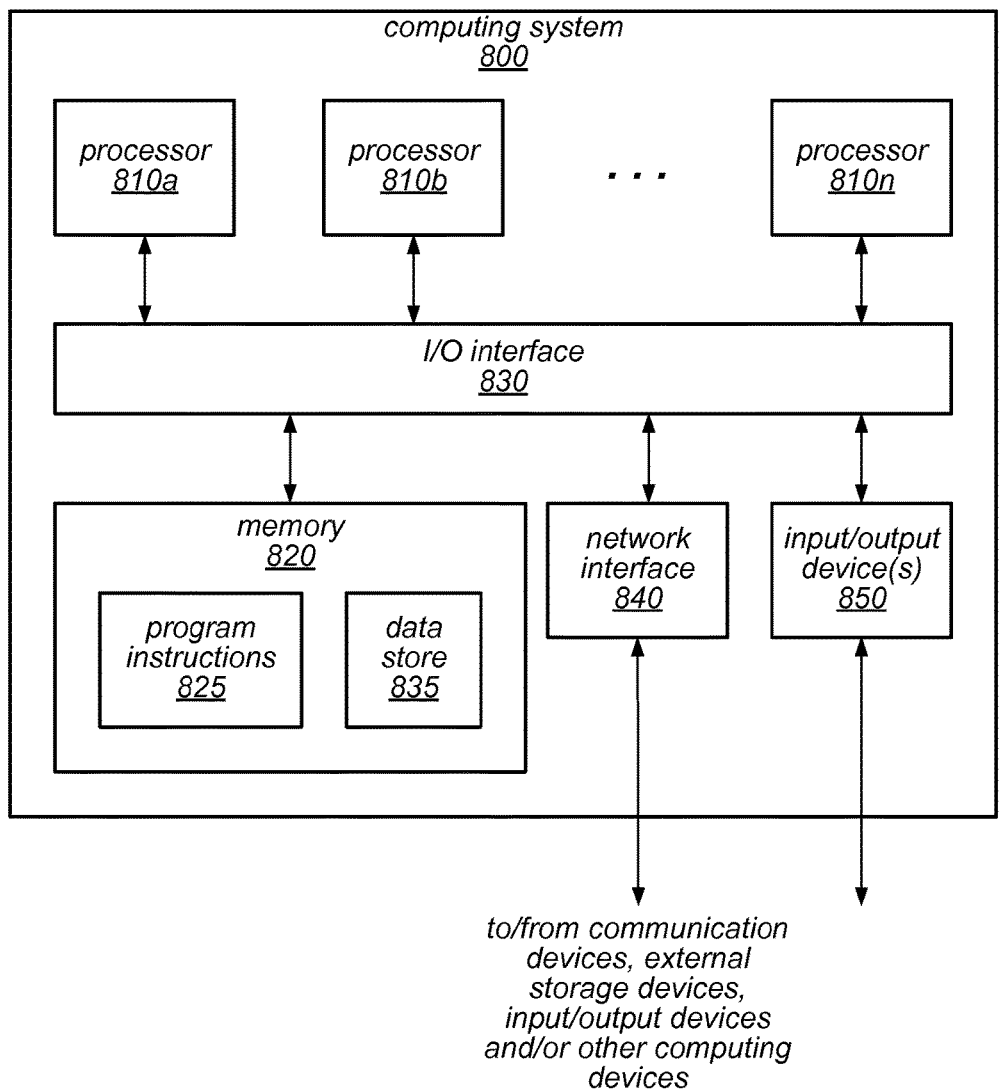
FIG. 8 is a block diagram illustrating an example computer system that implements some or all of the techniques described herein, according to different embodiments.

Any of various computer systems may be configured to implement a process for making packing recommendations. For example, FIG. 8 is a block diagram illustrating one embodiment of a computer system suitable for implementing the system and methods described herein. In various embodiments, servers 180, enterprise logic 190, or devices (e.g., customer device 130) may each include a computer system 800 such as that illustrated in FIG. 8. Other services and systems that the packing service may interact with, such as those illustrated in FIG. 3 (e.g., travel service, calendar service, e-mail service, etc.) may each include a computer system such as computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers (e.g., 180) implementing enterprise logic 190, while in other embodiments servers 180 may include more, fewer, or different elements than computer system 800. In some embodiments, computer system 800 may be illustrative of enterprise logic 190, or a communication device (e.g., computing-enabled glasses or a portable device) while in other embodiments a server implementing enterprise logic, or a communication device may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the recommendation engine 195 or customer device (e.g., device 130), are shown stored within system memory 820 as program instructions 825. In some embodiments, system memory 820 may include data 835 (e.g., a product database, purchase history, etc.) which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, for example. In particular, network interface 840 may be configured to allow communication between computer system 800 and/or various I/O devices 850. I/O devices 850 may include scanning devices, display devices, input devices and/or other communication devices, as described herein. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with recommendation engine 195 or device 130. In general, an I/O device 850 (e.g., cursor control device, keyboard, or display(s) may be any device that can communicate with elements of computing system 800. In one embodiment, at least some of the I/O devices 850 may be configured to scan or otherwise read or receive codes or identifiers of various objects and to communicate the codes to recommendation engine 195. Such components may include, but are not limited to, one or more of items, orders, containers or suitcases.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the enterprise logic, packing service, product database, device and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A device, comprising:
an image capture device for capturing image data;
a display for displaying content; and
one or more computer hardware processors in communication with the image capture device and the display, the one or more computer hardware processors configured to at least:
recognize, based on application of one or more computer-based object recognition techniques to image data obtained via the image capture device, a container to be packed with one or more items;
identify, based on computer-based analysis of the image data, context data for a packing operation associated with the container;
based at least in part on automated analysis of the obtained image data and the identified context data, determine an item packing recommendation for the container, wherein the automated analysis of the obtained image data comprises computer-based analysis of the obtained image data; and instruct presentation of the item packing recommendation via the display.

2. The device recited in claim 1, wherein the one or more processors are further configured to at least:
obtain updated image data of the container via the image capture device;
determine feedback based at least in part on the updated image data, wherein determining the feedback is based at least in part on recognition of a packed item in the updated image data using automated analysis of the updated image data; and
instruct presentation, on the display, of a message based at least in part on the feedback.

3. The device recited in claim 1, wherein the one or more processors are further configured to at least determine an available volume of the container for packing based at least in part on the image data of the container, and wherein the item packing recommendation is determined based at least in part on the available volume.

4. The device recited in claim 1, wherein the context data comprises at least one of travel information, destination information, user item packing preference information, purchase history information, or available item information, and wherein the context data is used to determine that at least one of a purchase-based recommendation to purchase an item or a spatial-based recommendation to pack an item in a particular location of the container, should be made.

5. The device recited in claim 1, wherein the computer-based analysis of the obtained image data comprises at least one of machine vision-based analysis or three-dimensional modeling.

6. A computer-implemented method comprising:
receiving, by one or more computer processors, container data derived from container image data captured by an image capture device;
determining, by the one or more computer processors, an available volume for a packing operation based at least in part on volume data for the container;
obtaining, by the one or more computer processors, context data for the packing operation, wherein context data comprises at least one of travel information, destination information, user item packing preference information, purchase history information, or available item information;
determining, by the one or more computer processors, an item packing recommendation for the packing operation based at least in part on the available volume for the packing operation and the context data for the packing operation; and
generating instructions to display the item packing recommendation.

7. The computer-implemented method as recited in claim 6,
wherein the item packing recommendation indicates a recommended item for packing; and
wherein said determining the item packing recommendation for the packing operation comprises:
determining a volume of the recommended item for packing; and
generating a spatial-based packing recommendation based at least in part on analysis of the volume of the container and the volume of the recommended item for packing, wherein the spatial-based recommendation indicates a placement of the recommended item in the container, and wherein the item packing recommendation includes the spatial-based packing recommendation.

8. The computer-implemented method as recited in claim 6, wherein the context data comprises travel information, wherein the travel information is obtained from a travel service, and wherein the travel information comprises at least one of a travel date, a number of travelers, or a form of travel transportation.

9. The computer-implemented method as recited in claim 8,
wherein the travel information comprises the travel date; and
wherein the item packing recommendation comprises a recommendation of an item for purchase based at least in part on determining, from item availability and delivery information, that the item can be delivered prior to the travel date.

10. The computer-implemented method as recited in claim 6, wherein the context data comprises travel destination information, wherein the travel destination information is obtained from a travel service, and wherein the travel destination information comprises at least one of weather information for the destination, length of stay at the destination or services available at the destination.

11. The computer-implemented method as recited in claim 6, wherein the context data comprises user item packing preference information, wherein the user item packing preference information is obtained from an electronic user profile, and wherein the user item packing preference information comprises at least one of characteristics of a preferred suitcase, a checklist of items to pack, a number of items to pack, types of items to pack, or preferred characteristics of items to be packed.

12. The computer-implemented method as recited in claim 6, wherein the context data comprises purchase history information, wherein the purchase history information is obtained from a transaction history system, and wherein the purchase history information comprises historical purchase transaction information for one or more travelers.

13. The computer-implemented method as recited in claim 6, wherein the context data comprises available item information, wherein the available item information is obtained from an e-commerce site, and wherein the available item information comprises information for an item that is available for delivery to at least one of:
a location of the container prior to travel, or
a travel destination during the travel period.

14. The computer-implemented method as recited in claim 6, wherein the computer-implemented method further comprises determining, based at least in part on the context data, that the item packing recommendation is at least one of a purchase-based recommendation to purchase an item for packing in the container or a spatial-based recommendation for packing an item in a particular location of the container.

15. The computer-implemented method as recited in claim 6,
wherein the item packing recommendation indicates a recommended item for packing; and
wherein generating instructions to display the item packing recommendation further comprises generating instructions to display a selectable user interface element that when selected generates instructions to order the recommended item.

16. The computer-implemented method as recited in claim 6, further comprising:
obtaining updated image data of the container;
determining feedback based at least in part on the updated image data, wherein determining the feedback comprises recognizing a packed item in the updated image data using machine vision analysis; and generating instructions to display a message based at least in part on the feedback.

17. The computer-implemented method as recited in claim 16, further comprising:

determining a volume of the recognized packed item;

updating the available volume based at least in part on the volume of the recognized packed item; and generating instructions to display another item packing recommendation, based at least in part on the updated available volume.

18. The computer-implemented method as recited in claim 6, wherein the received container data comprises a volume of the container, wherein the computer-implemented method further comprises obtaining a volume associated with one or more items in the container, and wherein determining the available volume for the packing operation based at least in part on volume data for the container comprises determining the difference between the volume of the container and the volume associated with the one or more items in the container.

19. The computer-implemented method as recited in claim 6, wherein determining the item packing recommendation for the packing operation based at least in part on the available volume for the packing operation and the context data for the packing operation comprises:

determining one or more items to be packed into the container based at least in part on information about a travel destination;

instructing a search on a network-based site for the one or more items to be packed in the container, wherein the instruction includes a limitation restricting results of the search based at least in part on the available volume for the packing operation; and determining the item packing recommendation for the packing operation based at least in part on the results of the search.

20. A non-transitory computer readable medium storing program instructions that, when executed by one or more processors of a computing device, perform operations comprising:

recognizing, based on applying one or more computer-based object recognition techniques to image data, a container, the image data captured by an image capture device;

identifying, based on computer-based analysis of the image data, context data for a packing operation associated with the container;

based at least in part on the image data and the context data, determining an item packing recommendation for the container; and generating instructions to present the item packing recommendation via a display.

21. The non-transitory computer readable medium as recited in claim 20, wherein the operations further comprise calculating a volume of the container based at least in part on the image data of the container, and wherein determining the item packing recommendation is based at least in part on the volume of the container that is calculated.

22. The non-transitory computer readable medium as recited in claim 20, wherein the context data is obtained from a memory of the computing device.

23. The non-transitory computer readable medium as recited in claim 20, wherein determining the item packing recommendation for the container further comprises:

sending the image data of the container to another computing device, wherein the other computing device is configured to calculate an available volume of the container based at least in part on the image data of the container;

receiving from the other computing device and in response sending the image data, the available volume of the container; and determining the item packing recommendation based at least in part on the available volume of the container received from the other computing device.

24. The non-transitory computer readable medium as recited in claim 20, wherein determining the item packing recommendation for the container further comprises:

sending the image data of the container to another computing device, wherein the other computing device is configured to determine the item packing recommendation based at least in part on the image data; and receive from the other computing device and in response sending the image data, the item packing recommendation.

25. The non-transitory computer readable medium as recited in claim 20, wherein determining an item packing recommendation for the container further comprises determining, based at least in part on the context data, that the item packing recommendation is at least one of a purchase-based recommendation to purchase an item or a spatial-based recommendation to pack an item in a particular location of the container.

* * * * *